(12) United States Patent
Shiao

(10) Patent No.: US 7,510,202 B1
(45) Date of Patent: Mar. 31, 2009

(54) FOLDABLE BICYCLE

(76) Inventor: Wen-Liang Shiao, No. 13-1, Lane 178, Syueshih Rd., Taichung (TW)

( * ) Notice: Subject to any disclaimer, the term of this patent is extended or adjusted under 35 U.S.C. 154(b) by 0 days.

(21) Appl. No.: 12/106,810

(22) Filed: Apr. 21, 2008

(30) Foreign Application Priority Data

Nov. 19, 2007 (TW) .............................. 96219523 U

(51) Int. Cl.
*B62K 15/00* (2006.01)
(52) U.S. Cl. ...................... 280/287; 280/278
(58) Field of Classification Search .................. 280/287, 280/278
See application file for complete search history.

(56) References Cited

U.S. PATENT DOCUMENTS 4,417,745 A * 11/1983 Shomo ....................... 280/287
5,398,955 A * 3/1995 Yeh ............................. 280/287
6,116,629 A * 9/2000 Koppensteiner ............. 280/287
6,293,575 B1 * 9/2001 Burrows et al. ............. 280/287

* cited by examiner

*Primary Examiner*—Tony H. Winner
(74) *Attorney, Agent, or Firm*—Apex Juris, pllc; Tracy M Heims

(57) ABSTRACT

A foldable bicycle has a rear frame, a folding assembly and a front frame. The rear frame has a seat tube, a bottom bracket, a rear fork and a rear wheel. The folding assembly is connected to the rear frame and has a supporting device, a rotating jacket and a locking device. The supporting device is connected to the bottom bracket and has a mounting bracket and a supporting element. The mounting bracket is connected to the bottom bracket. The connecting tube is pivotally connected to the mounting bracket. The extending tube is connected to the connecting tube. The rotating jacket is rotatably mounted around the extending tube. The locking device is connected to the rotating jacket and the seat tube of the rear frame. The front frame is connected to the folding assembly and has a top tube, a head tube, a front fork and a front wheel.

6 Claims, 7 Drawing Sheets

FOLDABLE BICYCLE

BACKGROUND OF THE INVENTION

1. Field of the Invention

The present invention relates to a foldable bicycle, and more particularly to a foldable bicycle with enhanced structural strength.

2. Description of Related Art

Bicycles are more and more popular in recent years because of their convenience and ability to provide exercise for a rider. However, the conventional bicycle has a large volume, then transporting and carrying the conventional bicycle is inconvenient.

With reference to FIGS. 6 and 7, a conventional foldable bicycle (70) is provided to solve the problem and usually comprise a front frame (71), a folding assembly (72) and a rear frame (73). The front frame (71) has a head tube (711) and a connecting shaft (712). The head tube (711) has a top end and an external surface. The connecting shaft (712) is formed on and protrudes from the external surface of the head tube (711) near the top end and has a rear end.

The folding assembly (72) is detachably connected to the front frame (71) and has a two linking tubes (721), two quick release fasteners (722), a mounting bracket (723) and a connecting tube (724). The linking tubes (721) are connected to the connecting shaft (712) and each linking tube (721) has a front end and a rear end. One of the quick release fasteners (722) is mounted on the front ends of the linking tubes (721) and is connected to the rear end of the connecting shaft (712). The other quick release fastener (722) is mounted around the linking tubes (721) near the rear ends. The mounting bracket (723) is mounted around the rear ends of the linking tubes (721). The connecting tube (724) is connected to the quick release fastener (722) that mounted around the linking tubes (721) near the rear ends and has a lower end.

The rear frame (73) is connected to the folding assembly (72) and has a seat tube (731) and a bottom bracket (732). The seat tube (731) is connected to the mounting bracket (723) and has a lower end. The bottom bracket (732) is connected to the lower ends of the connecting tube (724) and the seat tube (731).

However, the folding assembly (72) is transversely connected to the front frame (71) and the rear frame (73), and the connecting areas between the folding assembly (72) and the frames (71, 73) are small and this is an ineffective design for structural strength of the conventional foldable bicycle (70) and limits a weight bearing capacity of the conventional foldable bicycle or requires greater material usage for reinforcement.

To overcome the shortcomings, the present invention provides a foldable bicycle to mitigate or obviate the aforementioned problems.

SUMMARY OF THE INVENTION

The main objective of the present invention is to provide a foldable bicycle that can enhance structural strength of the folding bicycle.

The foldable bicycle in accordance with the present invention has a rear frame, a folding assembly and a front frame. The rear frame has a seat tube, a bottom bracket, a rear fork and a rear wheel. The folding assembly is connected to the rear frame and has a supporting device, a rotating jacket and a locking device. The supporting device is connected to the bottom bracket and has a mounting bracket and a supporting element. The mounting bracket is connected to the bottom bracket. The connecting tube is pivotally connected to the mounting bracket. The extending tube is connected to the connecting tube. The rotating jacket is rotatably mounted around the extending tube. The locking device is connected to the rotating jacket and the seat tube of the rear frame. The front frame is connected to the folding assembly and has a top tube, a head tube, a front fork and a front wheel.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
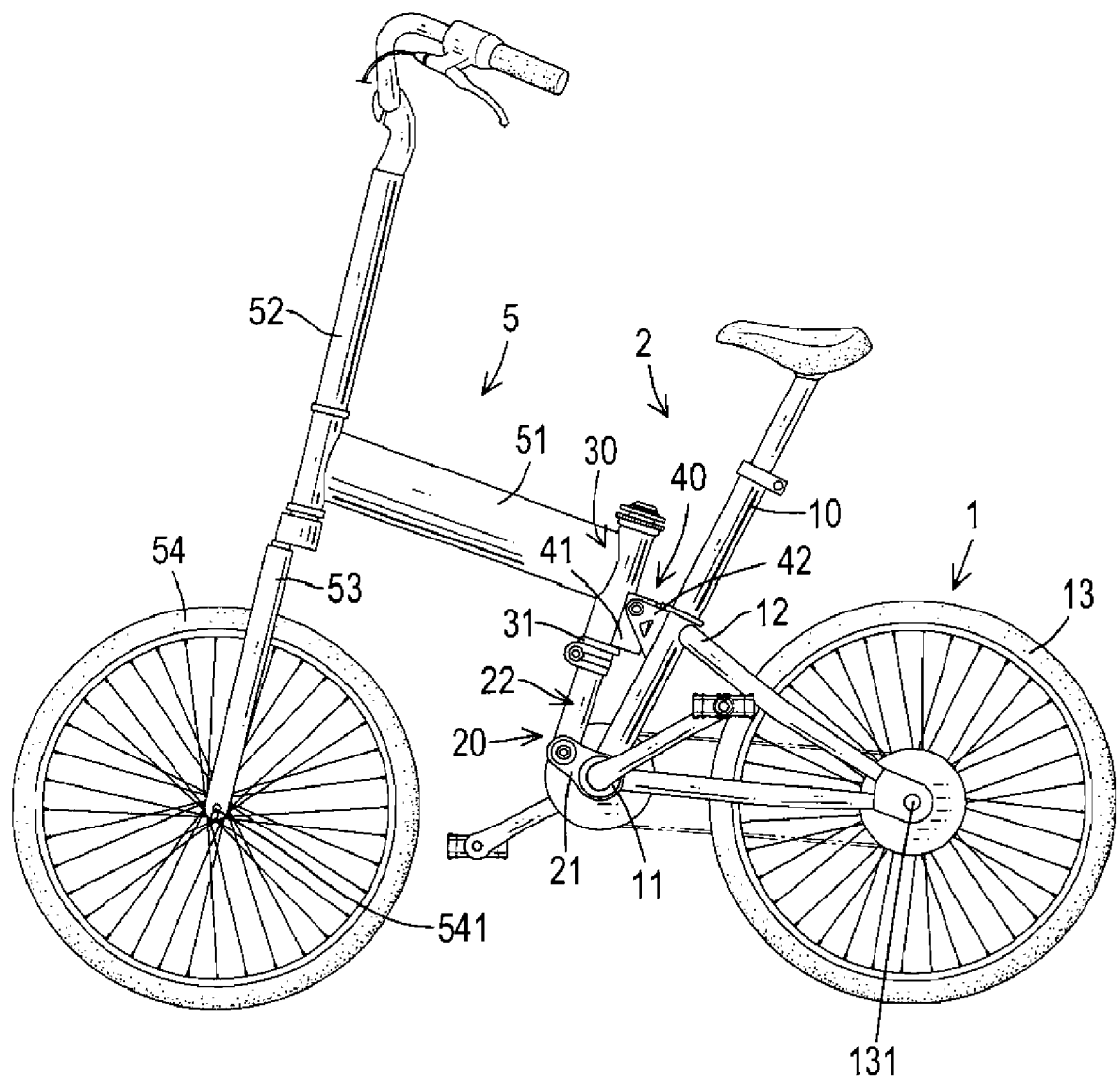
FIG. 1 is a side view of a foldable bicycle in accordance with the present invention.
Figure 2:
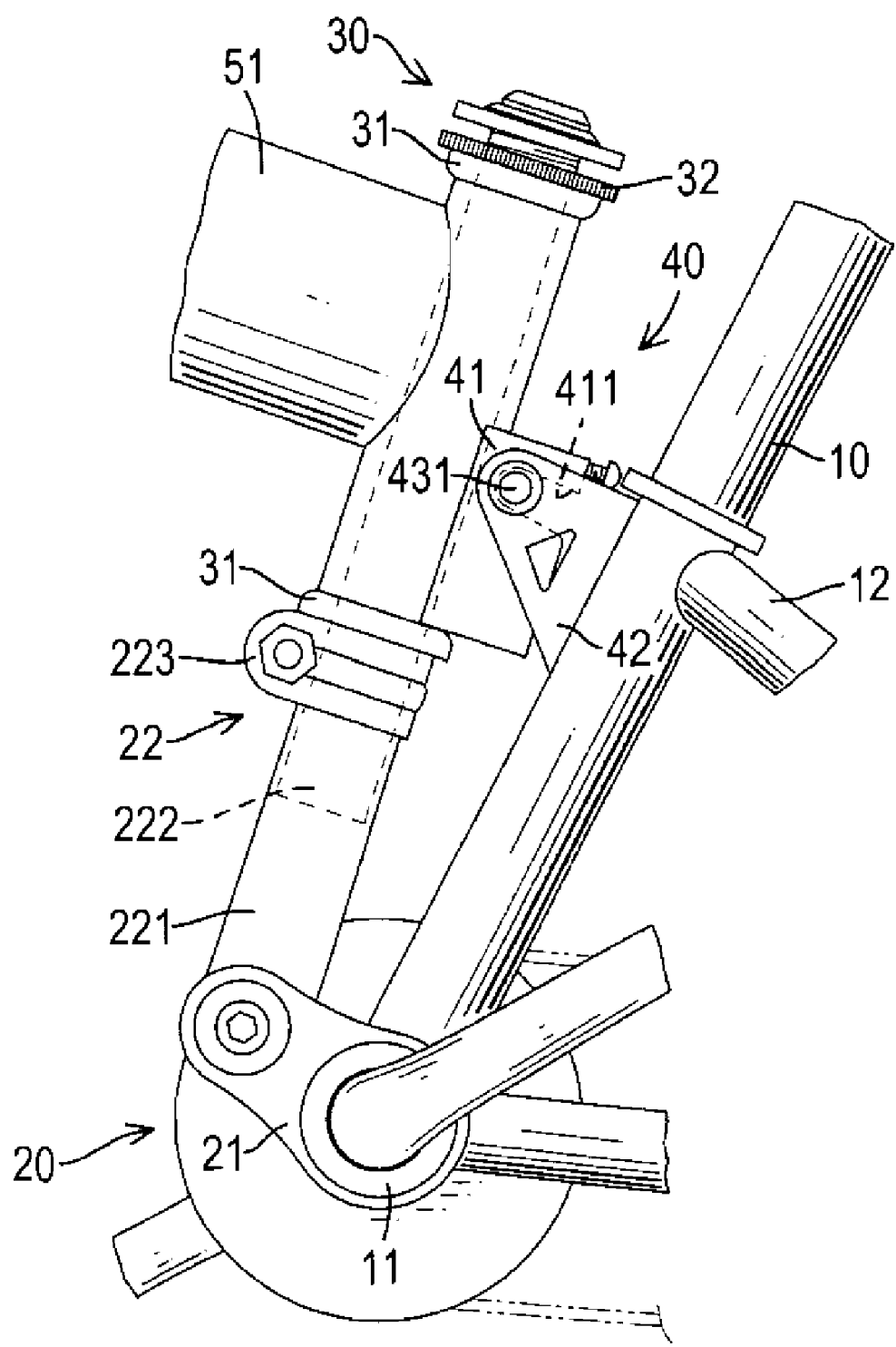
FIG. 2 is an enlarged side view of the foldable bicycle in FIG. 1.
Figure 3:
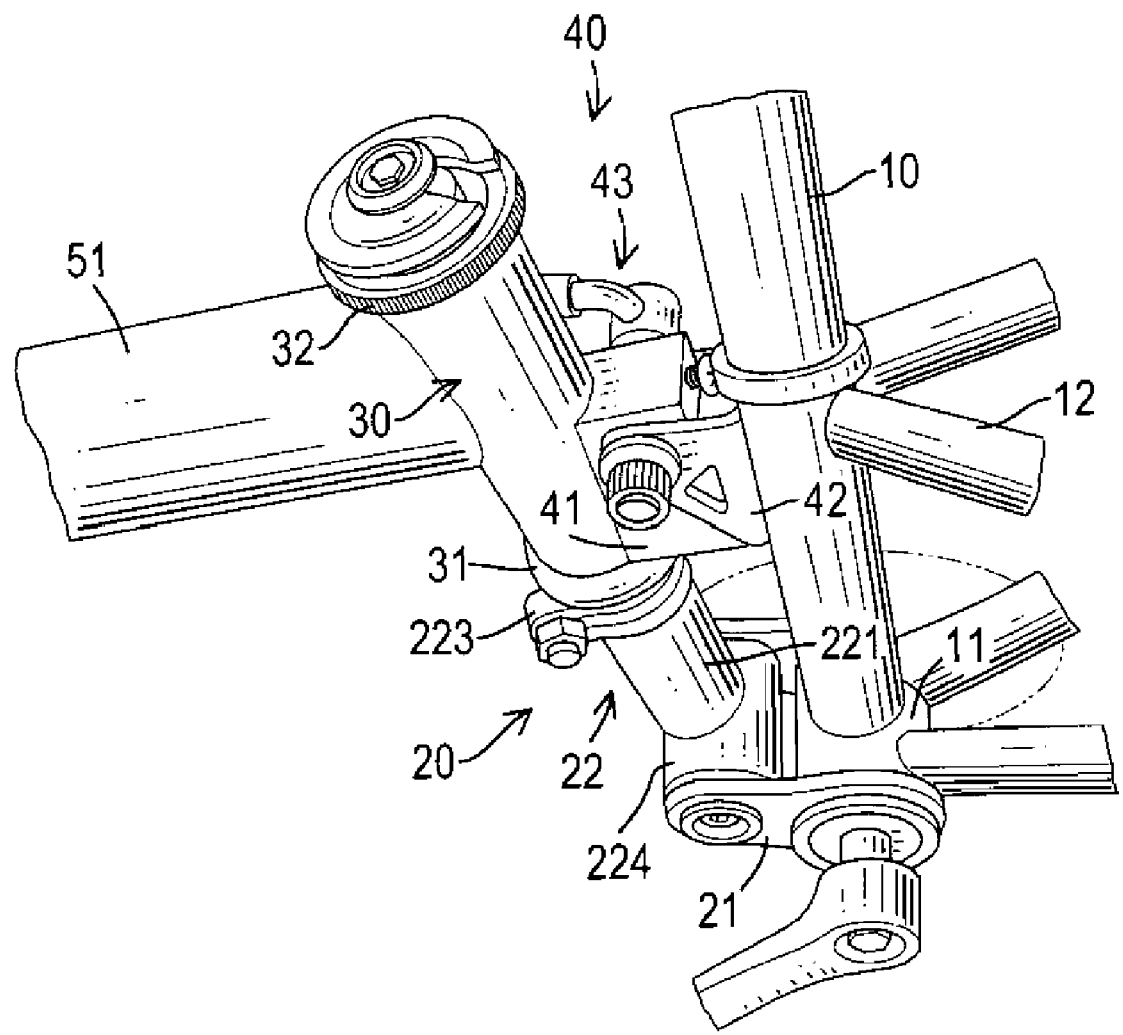
FIG. 3 is an enlarged perspective view of the foldable bicycle in FIG. 1.

With reference to FIGS. 1 to 3 and 5, a foldable bicycle in accordance with the present invention has a rear frame (1), a folding assembly (2) and a front frame (5).

The rear frame (1) has a seat tube (10), a bottom bracket (11), a rear fork (12) and a rear wheel (13).

The seat tube (10) has a bottom end and an external surface.

The bottom bracket (11) is connected to the bottom end of the seat tube (10) and has two free ends.

The rear fork (12) is connected to the seat tube (10) and the bottom bracket (11) and has a dropout (121).

The rear wheel (13) is rotatably connected to the rear fork (12) and has a wheel axle (131). The wheel axle (131) extends through the rear wheel (13) and is connected to the rear fork (12) and has two free ends connected to the dropout (121) of the rear fork (12). One of the free ends of the wheel axle (131) may be a protrusion or a magnet.

The folding assembly (2) is connected to the rear frame (1) and has a supporting device (20), a rotating jacket (30) and a locking device (40).

The supporting device (20) is connected to the bottom bracket (11) of the rear frame (1) and has a mounting bracket (21) and a supporting element (22).

The mounting bracket (21) is connected to the free ends of bottom bracket (11) of the rear frame (1) and has two front ends. The supporting element (22) is connected to the mounting bracket (21) and has a connecting tube (221), an extending tube (222) and a tightening element (223).

The connecting tube (221) may be hollow, is pivotally connected to the mounting bracket (21) and has a lower end, an upper end, an external surface and a pivot mount (224). The pivot mount (224) is formed on the lower end of the connecting tube (221) and is connected to the front ends of the mounting bracket (21).

The extending tube (222) may be formed with or mounted in the upper end of the connecting tube (221) and has a top end, an external surface, an outer thread and a diameter smaller than the connecting tube (221). The outer thread is formed on the external surface of the extending tube (222) near the top end.

The tightening element (223) is mounted around the external surface of the connecting tube (221) near the upper end to hold the extending tube (222) with the connecting tube (221).

The rotating jacket (30) is rotatably mounted around the extending tube (222) of the supporting device (20) and has a top end, a bottom end, an external surface, two rotating rings (31) and a nut (32). The rotating rings (31) are respectively mounted around the top end and the bottom end of the rotating jacket (30) and each rotating ring (31) may be a bushing or a bearing. The nut (32) is mounted on and engages the outer thread of the extending tube (222) to hold the corresponding rotating ring (31) with the top end of the rotating jacket (30).

The locking device (40) is connected to the rotating jacket (30) and the seat tube (10) of the rear frame (1) and has an engaging mount (41), a locking frame (42) and a quick release fastener (43).

The engaging mount (41) is formed on and protrudes from the external surface of the rotating jacket (30) and has a rear side and an engaging recess (411). The engaging recess (411) is formed in the rear side of the engaging mount (41).

The locking frame (42) is formed securely on the external surface of the seat tube and faces to the engaging recess (411) of the engaging mount (41).

The quick release fastener (43) is connected to the locking frame (42), engages the engaging mount (41) and has an engaging post (431) and an operating shaft (432). The engaging post (431) is connected to the locking frame (42), engages the engaging recess (411) of the engaging mount (41) and has two ends. The operating shaft (432) is pivotally connected to one of the ends of the engaging post (431) to pull the other end of the engaging post (431) pressing and holding the locking frame (42) with the engaging mount (41).

The front frame (5) is connected to the folding assembly (2) and has a top tube (51), a head tube (52), a front fork (53) and a front wheel (54).

The top tube (51) is formed on the external surface of the rotating jacket (30) opposites to the engaging mount (41) and has a front end.

The head tube (52) is connected to the front end of the top tube (51) and has a lower end.

The front fork (53) is connected to the lower end of the head tube (52).

The front wheel (54) is rotatably connected to the front fork (53) and has a wheel axle (541). The wheel axle (541) extends through the front wheel (54) and is connected to the front fork (53) and has two free ends. One of the free ends of the wheel axle (541) may be a mounting recess or a magnet to detachably connect to the free end of the wheel axle (131) of the rear wheel (13) that has a protrusion or a magnet.

Figure 4:
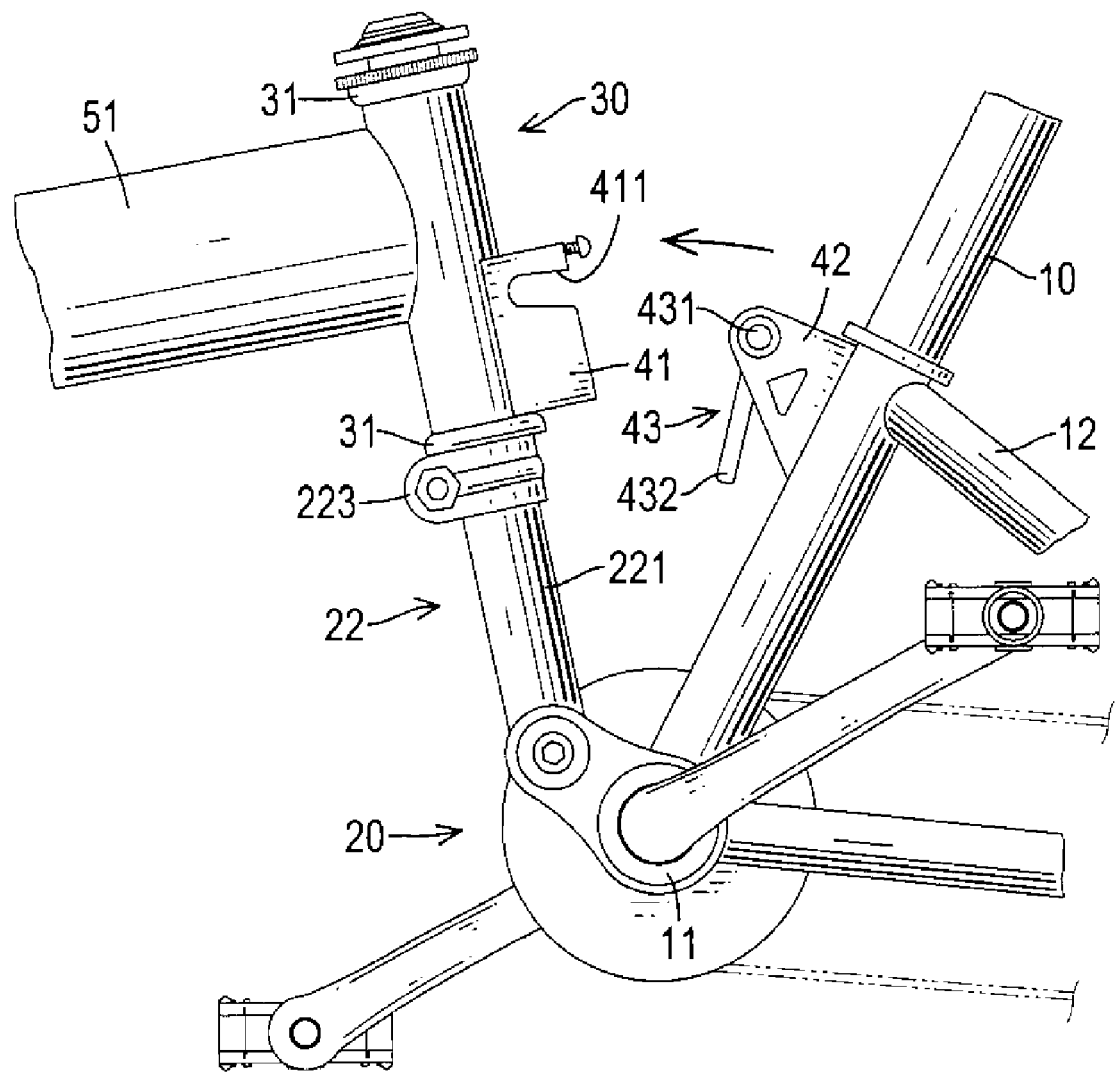
FIG. 4 is an operational side view of the foldable bicycle in FIG. 1.
Figure 5:
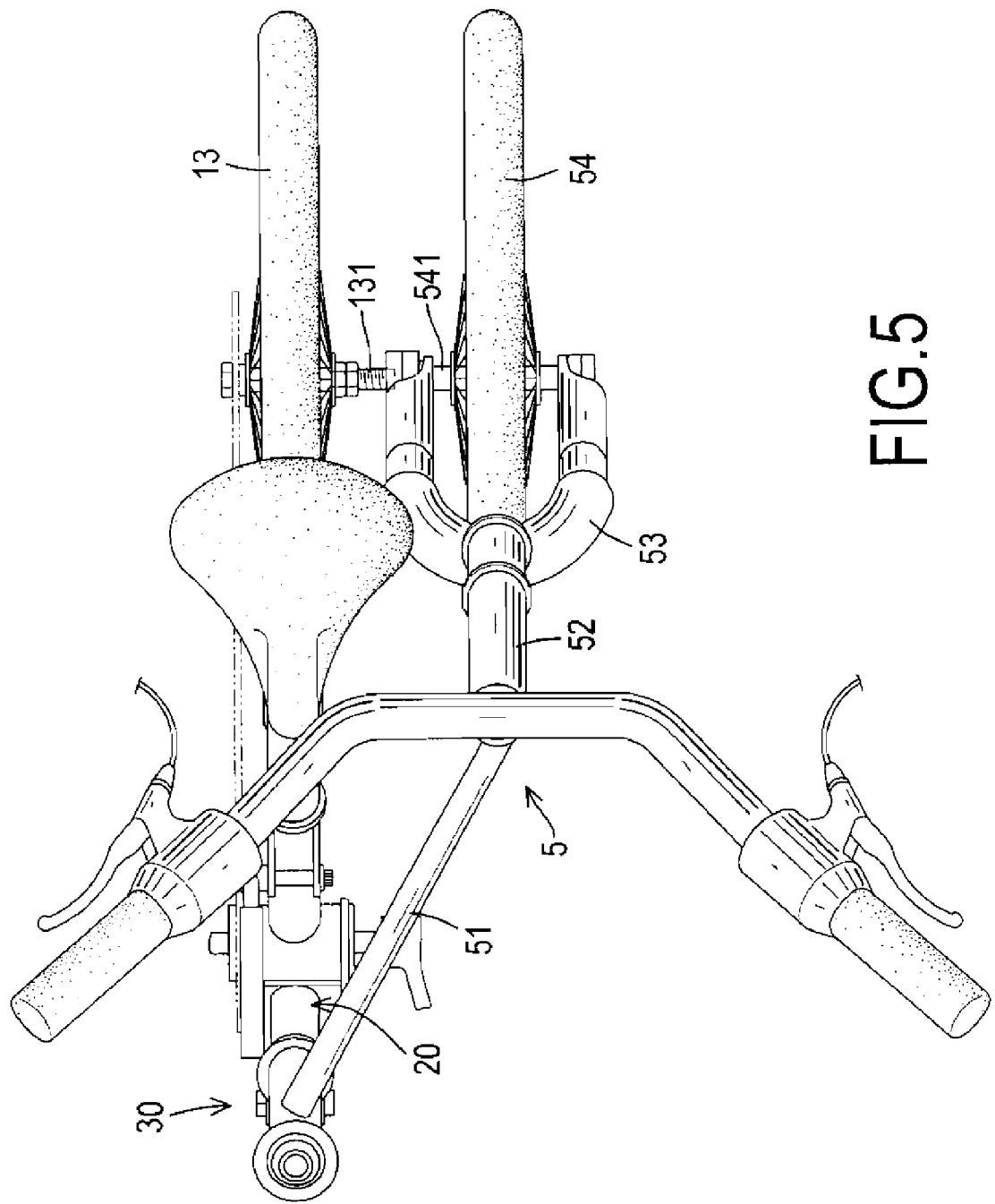
FIG. 5 is an operational top view of the foldable bicycle in FIG. 1.
Figure 6:
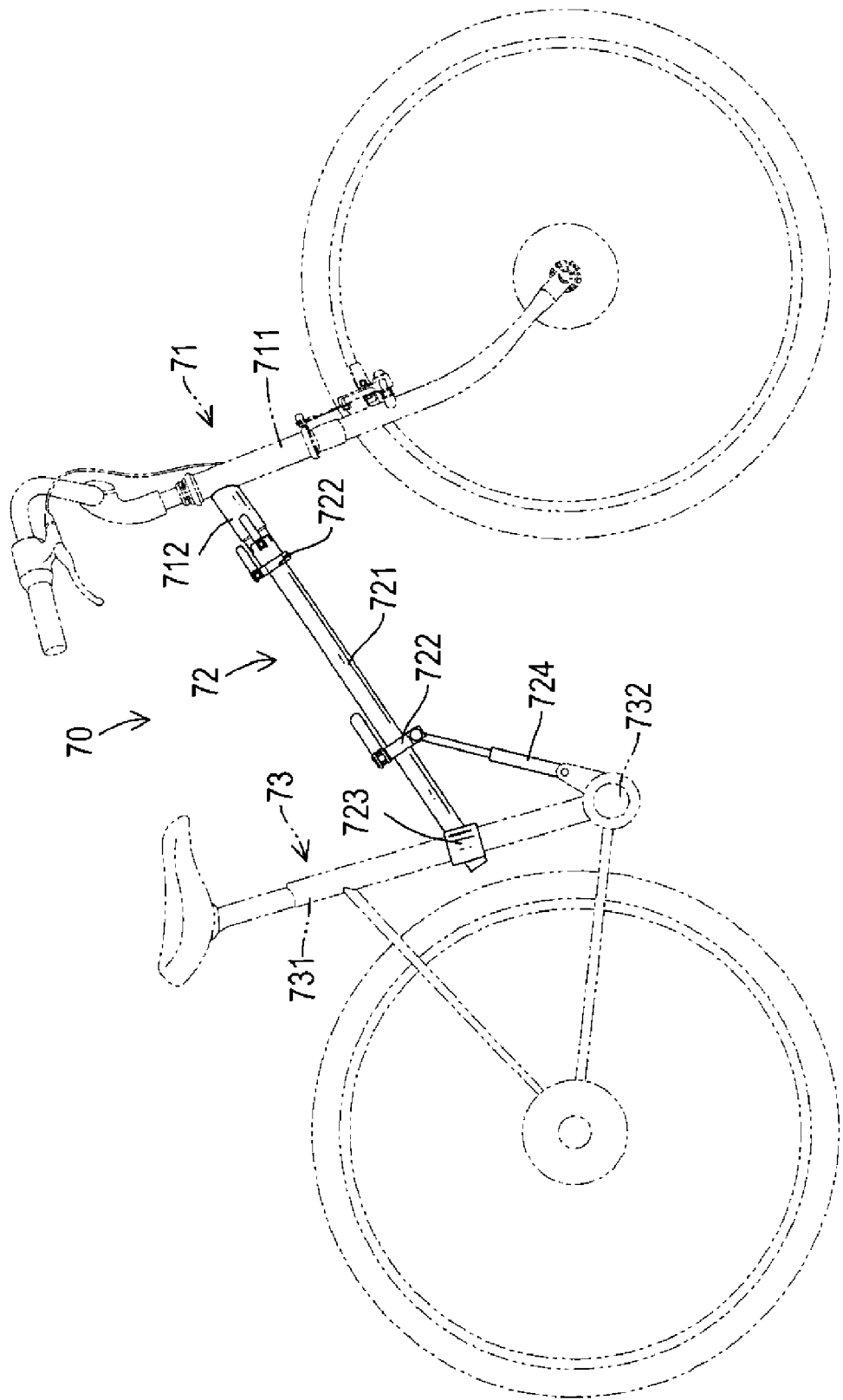
FIG. 6 is a side view of a foldable bicycle in accordance with the prior art.
Figure 7:
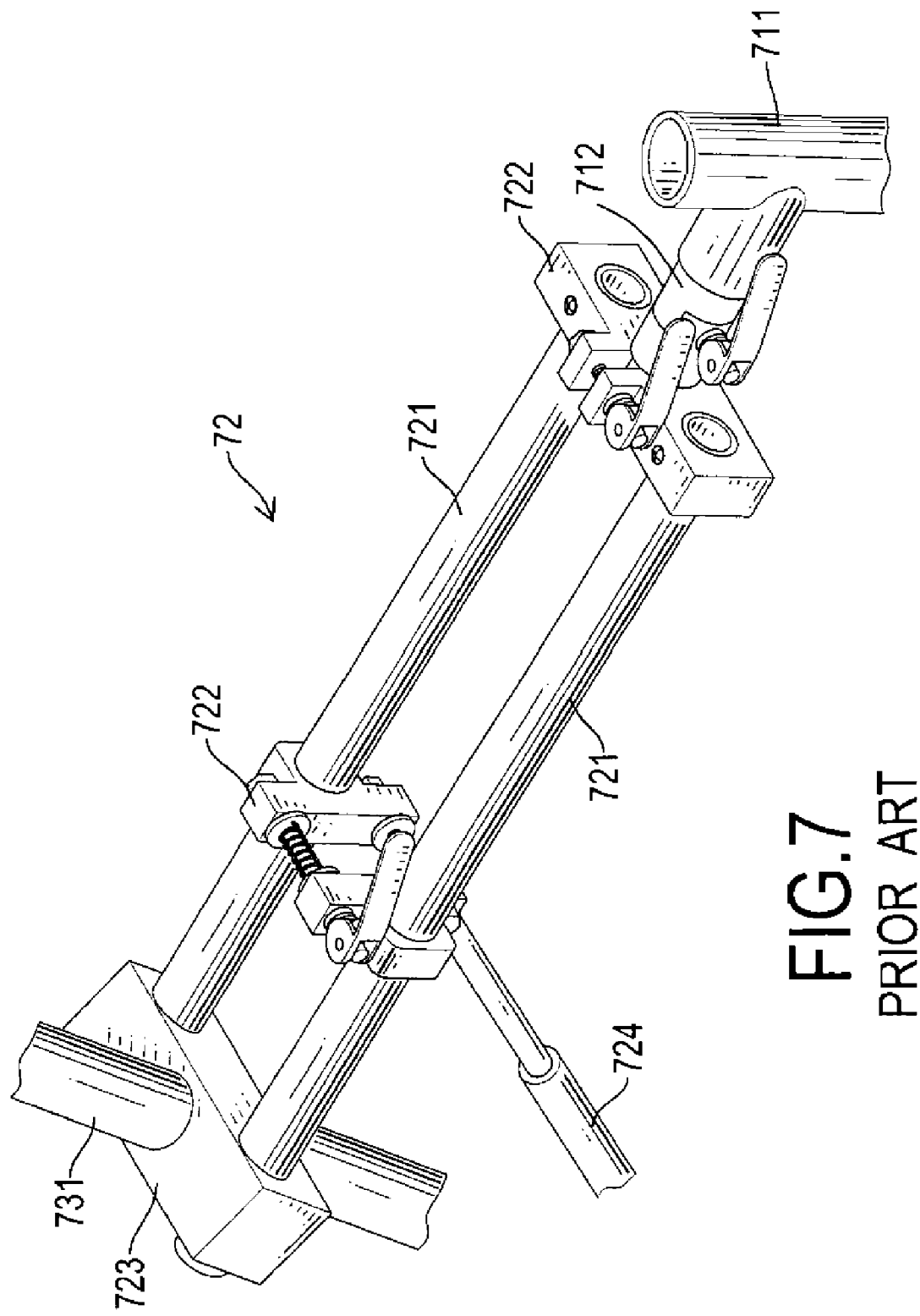
FIG. 7 is an enlarged perspective view of the foldable bicycle in FIG. 6.

With reference to FIG. 4, when the foldable bicycle needs to be folded to transport and carry, the user can rotate the operating shaft (432) relative to the engaging post (431). Then, the engaging post (431) can be separated from the engaging recess (411) of the engaging mount (41) and the front frame (5) will rotate relative to the rear frame (1). After separating the engaging post (431) from the engaging mount (41), the user can fold the front frame (5) to the rear frame (1) by rotating the rotating jacket (30) relative to the extending tube (222) of the supporting device (20). Then, the front frame (5) will be rotated backward to the rear frame (1), and the front wheel (54) will align with the rear wheel (13) and the free end that has a protrusion or a magnet of the wheel axle (131) of the rear wheel (13) is detachably mounted in or detachably connected to the free end that has a mounting recess or a magnet of the wheel axle (541) of the front wheel (54). When the wheel axles (131, 541) are connected to each other, the front wheel (54) can be held with the rear wheels (13) in a folded condition.

The supporting device (20) and the rotating jacket (30) are longitudinally connected to the rear frame (1) and the front frame (5) and parallel to the seat tube (10) of the rear frame (1), and the connecting areas between the folding assembly (2) and the frames (1, 5) are large enough to provide optimum structural strength to bear the weight of the folding bicycle and a user. Furthermore, when folding the foldable bicycle, the front wheel (54) can be held with the rear wheel (13) by the protrusion, the mounting recess or the magnets on the wheel axles (131, 541).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A foldable bicycle having
    a rear frame having
        a seat tube having
            a bottom end; and
            an external surface;
        a bottom bracket being connected to the bottom end of the seat tube and having two free ends;
        a rear fork being connected to the seat tube and the bottom bracket and having a dropout; and
        a rear wheel being rotatably connected to the rear fork and having a wheel axle connected to the dropout of the rear fork;
    a folding assembly being connected to the rear frame and having
        a supporting device being connected to the bottom bracket of the rear frame and having
            a mounting bracket being connected to the free ends of bottom bracket of the rear frame and having two front ends; and
            a supporting element being connected to the mounting bracket and having
                a connected tube being pivotally connected to the mounting bracket and having
                    a lower end being connected to the front ends of the mounting bracket;
                    an upper end; and
                    an external surface; and
                an extending tube being connected to the connecting tube and having a diameter smaller than the connecting tube;
        a rotating jacket being rotatably mounted around the extending tube of the supporting device and having
            a top end;
            a bottom end; and
            an external surface; and
        a locking device being connected to the rotating jacket and the seat tube of the rear frame; and
    a front frame being connected to the folding assembly and having
        a top tube being formed on the external surface of the rotating jacket opposite to the locking device and having a front end;

a head tube being connected to the front end of the top tube and having a lower end;

a front fork being connected to the lower end of the head tube; and a front wheel being rotatably connected to the front fork and having a wheel axle connected to the front fork.

2. The foldable bicycle as claimed in claim 1, wherein the locking device further has an engaging mount being formed on and protruding from the external surface of the rotating jacket and having a rear side; and an engaging recess being formed in the rear side of the engaging mount;

a locking frame being formed securely on the external surface of the seat tube and facing to the engaging recess of the engaging mount; and a quick release fastener being connected to the locking frame and engaging the engaging mount and having an engaging post being connected to the locking frame and engaging the engaging recess of the engaging mount and having two ends; and an operating shaft being pivotally connected to one of the ends of the engaging post to pull the other end of the engaging post pressing and holding the locking frame with the engaging mount.

3. The foldable bicycle as claimed in claim 2, wherein the connecting tube further has a pivot mount being formed on the lower end of the connecting tube and being connected to the front ends of the mounting bracket.

4. The folding bicycle as claimed in claim 3, wherein:

the connecting tube is hollow;

the extending tube is mounted in the upper end of the connecting tube and has a top end;

an external surface; and an outer thread being formed on the external surface of the extending tube near the top end;

the mounting bracket further has a tightening element being mounted around the external surface of the connecting tube near the upper end to hold the extending tube with the connecting tube; and the rotating jacket further has two rotating rings being respectively mounted around the top end and the bottom end of the rotating jacket; and a nut being mounted on and engaging the outer thread of the extending tube to hold the corresponding rotating ring with the top end of the rotating jacket.

5. The foldable bicycle as claimed in claim 4, wherein:

the wheel axle of the rear wheel has two free ends and one of the free ends is a protrusion; and the wheel axle of the front wheel has two free ends and one of the free ends is a mounting recess and is mounted around the protrusion when the bicycle is folded.

6. The foldable bicycle as claimed in claim 1, wherein the connecting tube further has a pivot mount being formed on the lower end of the connecting tube and being connected to the front ends of the mounting bracket.

\* \* \* \* \*